United States Patent [19]
Schiettecatte

[11] Patent Number: 5,233,145
[45] Date of Patent: Aug. 3, 1993

[54] POURING RECEPTACLE FOR INFUSIONS FOR USE IN MICROWAVE OVENS

[75] Inventor: Patrice Schiettecatte, Lon Rai, France

[73] Assignee: Moulinex (Societe Anonyme), Bagnolet, France

[21] Appl. No.: 844,755

[22] Filed: Mar. 2, 1992

[30] Foreign Application Priority Data

Mar. 4, 1991 [FR] France ............................ 91 02531

[51] Int. Cl.$^5$ ............................................. H05B 6/80
[52] U.S. Cl. ........................ 219/10.55 E; 219/10.55 F; 99/DIG. 14; 215/100 A; 220/648; 220/649
[58] Field of Search ................. 219/10.55 E, 10.55 F, 219/10.55 M; 426/81, 82, 243; 99/306, 327, DIG. 14; 220/914, 648, 649, 759; 215/100 A

[56] References Cited

U.S. PATENT DOCUMENTS

| | | | |
|---|---|---|---|
| 2,378,867 | 6/1945 | Reichart | 220/759 |
| 3,241,699 | 3/1966 | Burg | 215/100 A |
| 3,688,936 | 9/1972 | Killigrew, Jr. | 215/100 A |
| 3,717,288 | 2/1973 | Schelegel | 215/100 A |
| 3,846,608 | 11/1974 | Valles | 219/10.55 E |
| 4,104,957 | 8/1978 | Freedman et al. | 219/10.55 E |
| 4,158,464 | 6/1979 | Bowen et al. | 215/100 A |
| 4,746,028 | 5/1988 | Bagg | 215/100 A |

Primary Examiner—Bruce A. Reynolds
Assistant Examiner—Tuan Vinh To
Attorney, Agent, or Firm—Young & Thompson

[57] ABSTRACT

Pouring receptacle for infusion, adapted to be placed in a microwave oven and comprising a body (1) to which is secured a handle (2) by an encircling band (3), the body (1) and the handle (2) being of a material transparent to microwaves. The encircling band (3) clamps a portion (4, 16) of the handle (2) to the body (1) and is of a material having a coefficient of expansion near that of the body, transparent to microwaves and resistant to deformation during successive thermal cycles. The band is a structure reinforced by fibers. The fibers can be applied by winding from a spool, or the band (3) can be molded and heated to expand it so it slips over the body (1) and cools and contracts to grip the body (1) firmly.

6 Claims, 1 Drawing Sheet

POURING RECEPTACLE FOR INFUSIONS FOR USE IN MICROWAVE OVENS

The present invention relates to a pouring receptacle for infusions, adapted to be placed in a microwave oven, and comprising a body to which is fixed a handle by securement means, the body and the handle being formed of material transparent to microwaves.

To be able to use a receptacle of this type in a microwave oven, it is indispensable that the securement means themselves will be transparent to microwaves, which is to say that they heat up practically not at all.

In known receptacles of this type whose body is of glass, the use of securement means in the form of an encircling band of plastic material, for example polypropylene or polycarbonate which are nevertheless transparent to microwaves, is avoided, because it is known that under certain circumstances, the heating of the body softens the plastic, such that after a certain number of thermal cycles, a residual deformation will appear. This flow leads to separation of the handle from the body. It is preferred, to avoid this drawback, to have recourse to direct cementing of the handle on the body (for example by silicone-type cements). But it is not desirable to make the handle of polypropylene, which is cemented with difficulty and requires special treatment. Preferably, ABS should be chosen, which is not transparent to microwaves, such that, to avoid heating, recourse must be had to a handle of small thickness which is accordingly fragile under shock. Moreover, ABS is troublesome. Still further, the cementing requires cementing surfaces which are very clean and a long period of immobilization of the members, which is a drawback in mass production and increases the cost of manufacture.

The invention has for its object to overcome these drawbacks, and in particular to provide at least cost, reliable securing means, which will be durable while being transparent to microwaves.

According to the invention, the securement means comprise an encircling band which connects a portion of the handle to said body and which is of a material having a coefficient of expansion near that of the body, transparent to microwaves and resisting deformation during successive thermal cycles.

Thanks to such a judicious choice of material, there is obtained an encircling band which ensures permanent gripping of the handle on the body. Thus, the material expands at the same time as the body but with no distortion at the end of many thermal cycles.

According to a preferred embodiment of the invention, the material of the encircling band comprises a structure based on fibers.

Thus the utilization of fibers permits, in addition to obtaining the required gripping qualities, expansion and thermal stability, avoiding distortion. Moreover, these fibers are of reasonable cost which is of primary importance for mass production. The fibers permit rapid assembly, their manufacturing process being automatable.

The characteristics and advantages of the invention will further appear from the description which follows, by way of example, with reference to the accompanying drawing, in which.

Figure 1:
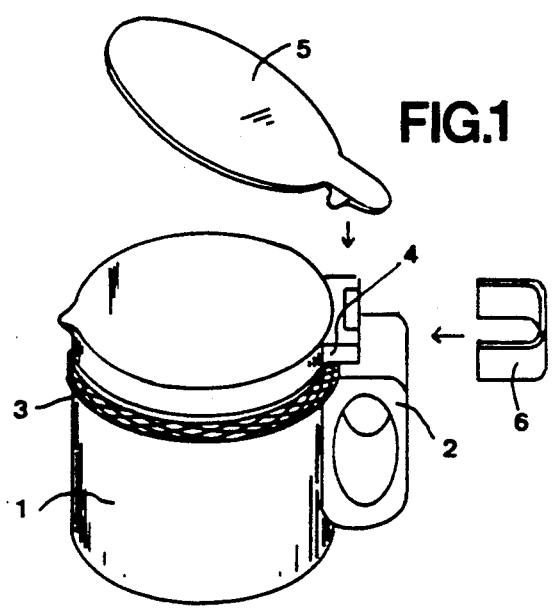
FIG. 1 is a perspective view of a receptacle according to the invention.

The pouring receptacle for infusions shown in FIG. 1 comprises a body 1 to which is secured a handle 2 by securement means 3. To be able to place the receptacle in a microwave oven, the body 1 and the handle 2 are each made of a material transparent to microwaves. The body 1 is for example of glass or of ceramic, the handle 2 can be either in plastic, for example polypropylene or polycarbonate, or a composite material, for example polypropylene charged with fibers.

According to the invention, the securement means 3 comprise an encircling band which connects a portion 4 of the handle 2 to said body 1 and which is of a material having a coefficient of expansion near that of body 1, transparent to microwaves and resistant to deformation during successive thermal cycles. A cover 5 and a guard strip 6 can if desired be secured to the handle 2.

The material of the encircling band 3 comprises a structure based on fibers 7. The fibers 7 are preferably of the type of glass or silica. Thus, the fibers 7, being of a nature analogous to that of body 1, have thermal properties similar to the latter and are transparent to microwaves.

The fibers 7 can be utilized alone, for example wound directly about the body 1 and a portion 4 of the handle 2 so as to constitute a network for example of the braided type.

The fibers 7 can also be used in combination with another product, the material of the encircling band being thus a composite material.

According to an embodiment of the invention, the composite material of the encircling band 3 comprises a network of fibers held together by a binder of the resin or cement type, for example cement of the silicon type that adheres to glass or of the thermoplastic type (polypropylene) or of the thermosetting type (mono- or bi-component resin) or of the type soluble in a solvent (polyester sulfone).

Figure 2:
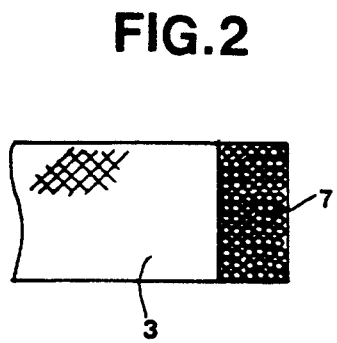
FIG. 2 is a fragmentary cross sectional view of an encircling band according to the invention showing a network of wound fibers.

As shown in FIG. 2, the fiber network can be present in the form of a fiber 7 which is wound directly about the body 1 and the handle 2 to form a braid.

Figure 3:
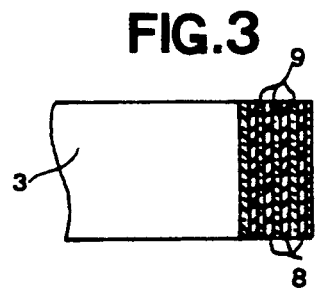
FIG. 3 is a view like that of FIG. 2 showing wound-up layers of fibers.

As illustrated in FIG. 3, the fiber network may also be present in the form of a thin band or of a flattened braid 8 which encircles the body 1 and a portion 4 of the handle 2 in one or several turns. There could be used for example a braid of glass fiber clad with a binder of the polysulfone type rolled in layers successively about the assembly formed by the body 1 and the handle 2.

There will now be described two processes for making a receptacle according to the invention, performed in an entirely automatic way:

According to a first process, fibers 7 are wound directly about the body 1 and a portion 4 of the handle 2 by means of a mechanical winder of which a spool, on the one hand, turns about the assembly comprised by the body 1 and the handle 2 and which assembly is maintained fixed and, on the other hand, undergoes at the same time a slow translation so as to wind about said assembly over a certain width.

According to another process, the assembly comprised by the body 1 and the handle 2 is placed on a flat support which turns and simultaneously effects a slow translation in front of a fixed spool of fibers 7, so as to surround said assembly with the fibers over a certain width.

During winding, the fibers can be impregnated with a binder, for example at the output of the spool, or the fibers could also be covered with a layer of binder in the course of formation of the strip. The binder should then be hardened or polymerized by any conventional means (air, temperature, catalyst, ultraviolet, evaporation of a solvent).

At the end of winding, the ends of the fibers are secured to the portion 4 of the handle 2 by means of a final operation. The final operation could consist, for example, in welding the ends ultrasonically, or else heating the strip over all its length so as to melt the binder which solders the fibers to each other and in particular the ends thereof, then letting it harden by cooling.

For aesthetic reasons, either the binder or the fiber can also be impregnated with coloring material, or a decorative substance can be incorporated.

Figure 4:
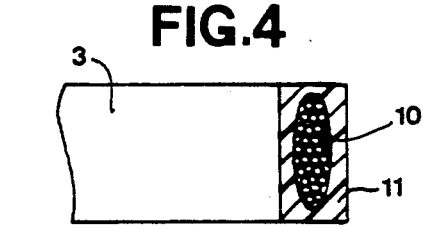
FIG. 4 is a view like FIG. 2 showing a plastic material molded about the network of fibers.
Figure 5:
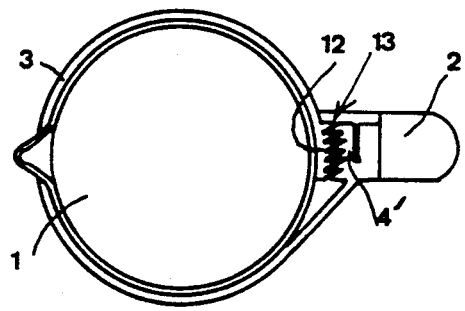
FIG. 5 is a top plan view of a receptacle according to another embodiment of the invention in which the encircling band and the handle are molded of a single piece.

In another embodiment of the invention shown in FIGS. 4 and 5, the composite material of the encircling strip 3 comprises a bundle of fibers 10 about which is molded a plastic material 11 of the thermosetting or thermoplastic type, for example a braid of glass fibers about which is molded either polypropylene, or polysulfone, or polyethylene sulfide.

The handle 2 and the encircling band 3 can be preferably molded of a single piece, and the end 12 of the band and said portion 4' of the handle 2 comprise mutual tensioning and locking means 13, for example complementary teeth on the handle 2 and strip 3.

Figure 6:
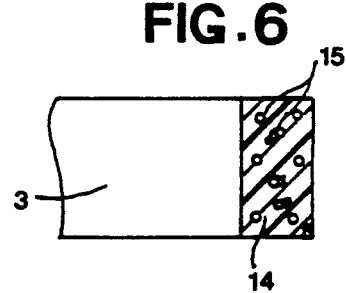
FIG. 6 is a view like FIG. 2 showing a plastic material charged with short fibers.
Figure 7:
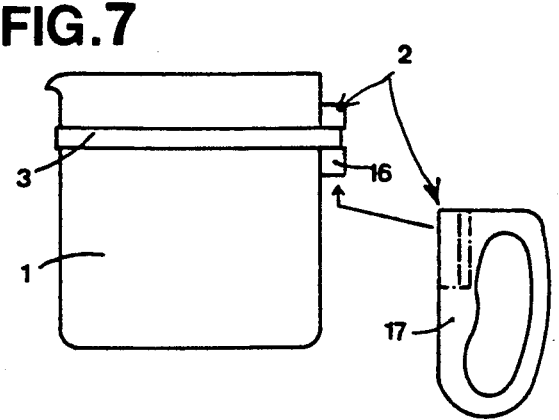
FIG. 7 is an elevational view of a receptacle according to another embodiment of the invention in which the handle is made of two parts.
Figure 8:
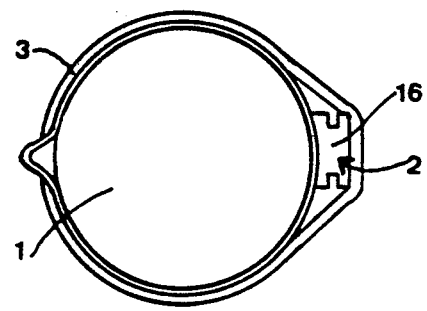
FIG. 8 is a top plan view of FIG. 7, in which only the portion of the handle secured to the body is shown.

According to an embodiment of the invention shown in FIGS. 6, 7 and 8, the composite material of the encircling band 3 is made of a plastic material 14 charged with short fibers 15, for example, polypropylene charged with mineral fibers.

In the embodiment of FIG. 7, the handle 2 is disengageable into at least two portions 16, 17, a portion 16 secured to body 1 and a portion 17 adapted to be gripped. This portion 16 can in certain cases be made of a material having a certain elasticity.

The method of manufacture is accordingly very simple: the encircling band 3 is molded in the form of a ring, then it is heated so that it expands. It is then placed about the assembly comprised by the body 1 and the portion 16 of the handle 2, the assembly being cold. Then, it is permitted to cool so that the band 3 grips said assembly firmly. The second portion 17 of the handle 2 is then fixed on the first portion 16 by a sliding connection, for example dovetailing.

What is claimed is:

1. A pouring receptacle for infusions, adapted to be placed in a microwave oven and comprising a body made of glass which is transparent to microwaves, a handle made of a material transparent to the microwaves and secured to said body by an encircling band made of a material transparent to microwaves, wherein the material of said encircling band comprises a structure based on glass fibers.

2. The receptacle as claimed in claim 1, wherein said structure comprises a network of glass fibers held together by a binder of the resin or cement type.

3. The receptacle as claimed in claim 1, wherein said structure comprises glass fibers dispersed within a plastic material.

4. The receptacle as claimed in claim 2, wherein said network of glass fibers is in the form of a thin band or of a flattened braid which surrounds said body and a portion of said handle in at least one turn.

5. The receptacle as claimed in claim 1, wherein said structure comprises a bundle of glass fibers about which is molded a plastic material.

6. The receptacle as claimed in claim 5, wherein said handle and said encircling band are molded of a single piece, the end of said band and the handle comprising cooperating tension and locking means.

* * * * *